(12) United States Patent
Agapi et al.

(10) Patent No.: US 8,214,242 B2
(45) Date of Patent: Jul. 3, 2012

(54) SIGNALING CORRESPONDENCE BETWEEN A MEETING AGENDA AND A MEETING DISCUSSION

(75) Inventors: Ciprian Agapi, Lake Worth, FL (US); William K. Bodin, Austin, TX (US); Charles W. Cross, Jr., Wellington, FL (US); Brian D. Goodman, Brooklyn, NY (US); Frank L. Jania, Chapel Hill, NC (US); Darren M. Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 12/109,227

(22) Filed: Apr. 24, 2008

(65) Prior Publication Data

US 2009/0271438 A1 Oct. 29, 2009

(51) Int. Cl.
*G06Q 10/00* (2012.01)
(52) U.S. Cl. .................. 705/7.19; 707/705
(58) Field of Classification Search .............. 705/8, 9, 705/7.19; 707/608, 731
See application file for complete search history.

(56) References Cited

U.S. PATENT DOCUMENTS

| | | | |
|---|---|---|---|
| 5,577,165 A | 11/1996 | Takebayashi et al. |
| 5,584,052 A | 12/1996 | Galau et al. |
| 5,969,717 A | 10/1999 | Ikemoto |
| 6,208,972 B1 | 3/2001 | Grant et al. |
| 6,243,375 B1 | 6/2001 | Speicher |
| 6,275,806 B1 | 8/2001 | Pertrushin |
| 6,301,560 B1 | 10/2001 | Masters |
| 6,513,011 B1 | 1/2003 | Uwakubo |
| 6,606,599 B2 | 8/2003 | Grant et al. |
| 6,856,960 B1 | 2/2005 | Dragosh et al. |
| 6,920,425 B1 | 7/2005 | Will et al. |
| 6,999,930 B1 | 2/2006 | Roberts et al. |
| 7,035,805 B1 | 4/2006 | Miller |
| 7,150,399 B2 | 12/2006 | Barrus et al. |
| 7,171,243 B2 | 1/2007 | Watanabe et al. |
| 7,188,067 B2 | 3/2007 | Grant et al. |
| 7,330,890 B1 | 2/2008 | Partovi et al. |
| 7,376,586 B1 | 5/2008 | Partovi et al. |
| 7,487,085 B2 | 2/2009 | Cross |

(Continued)

FOREIGN PATENT DOCUMENTS

CN 1385783 12/2002

(Continued)

OTHER PUBLICATIONS

U.S. Appl. No. 10/919,005, filed Dec. 2005, Eichenberger, et al.

(Continued)

*Primary Examiner* — John E Breene
*Assistant Examiner* — Christopher J Raab
(74) *Attorney, Agent, or Firm* — DeLizio Gilliam, PLLC

(57) ABSTRACT

Signaling correspondence between a meeting agenda and a meeting discussion includes: receiving a meeting agenda specifying one or more topics for a meeting; analyzing, for each topic, one or more documents to identify topic keywords for that topic; receiving meeting discussions among participants for the meeting; identifying a current topic for the meeting in dependence upon the meeting agenda; determining a correspondence indicator in dependence upon the meeting discussions and the topic keywords for the current topic, the correspondence indicator specifying the correspondence between the meeting agenda and the meeting discussion; and rendering the correspondence indicator to the participants of the meeting.

15 Claims, 5 Drawing Sheets

U.S. PATENT DOCUMENTS

| | | | |
|---|---|---|---|
| 7,606,444 B1 * | 10/2009 | Erol et al. | 382/305 |
| 2002/0065944 A1 | 5/2002 | Hickey et al. | |
| 2002/0092019 A1 | 7/2002 | Marcus | |
| 2002/0098891 A1 | 7/2002 | Graham et al. | |
| 2002/0099553 A1 | 7/2002 | Brittan et al. | |
| 2002/0120554 A1 | 8/2002 | Vega | |
| 2002/0147593 A1 | 10/2002 | Lewis et al. | |
| 2002/0184610 A1 | 12/2002 | Chong et al. | |
| 2003/0039341 A1 | 2/2003 | Burg et al. | |
| 2003/0046316 A1 | 3/2003 | Gergic et al. | |
| 2003/0046346 A1 | 3/2003 | Mumick et al. | |
| 2003/0101451 A1 | 5/2003 | Bentolila et al. | |
| 2003/0125945 A1 | 7/2003 | Doyle | |
| 2003/0179865 A1 | 9/2003 | Stillman et al. | |
| 2003/0182622 A1 | 9/2003 | Sibal et al. | |
| 2003/0195739 A1 | 10/2003 | Washio | |
| 2003/0217161 A1 | 11/2003 | Balasuriya | |
| 2003/0229900 A1 | 12/2003 | Reisman | |
| 2003/0235282 A1 | 12/2003 | Sichelman et al. | |
| 2004/0019487 A1 | 1/2004 | Kleindienst et al. | |
| 2004/0025115 A1 | 2/2004 | Seinel et al. | |
| 2004/0031058 A1 | 2/2004 | Reisman | |
| 2004/0044516 A1 | 3/2004 | Kennewick et al. | |
| 2004/0049390 A1 | 3/2004 | Brittan et al. | |
| 2004/0059705 A1 | 3/2004 | Wittke et al. | |
| 2004/0083109 A1 | 4/2004 | Halonen et al. | |
| 2004/0120472 A1 | 6/2004 | Popay et al. | |
| 2004/0120476 A1 | 6/2004 | Harrison et al. | |
| 2004/0138890 A1 | 7/2004 | Ferrans et al. | |
| 2004/0153323 A1 | 8/2004 | Charney et al. | |
| 2004/0179038 A1 | 9/2004 | Blattner et al. | |
| 2004/0216036 A1 | 10/2004 | Chu et al. | |
| 2004/0236574 A1 | 11/2004 | Ativanichayaphong | |
| 2004/0260562 A1 | 12/2004 | Kijirai | |
| 2005/0075884 A1 | 4/2005 | Badt, Jr. | |
| 2005/0091059 A1 | 4/2005 | Lecoeuche | |
| 2005/0131701 A1 | 6/2005 | Cross | |
| 2005/0138219 A1 | 6/2005 | Boughannam | |
| 2005/0138647 A1 | 6/2005 | Boughannam | |
| 2005/0154580 A1 | 7/2005 | Horowitz et al. | |
| 2005/0160461 A1 | 7/2005 | Baumgartner et al. | |
| 2005/0188412 A1 | 8/2005 | Dacosta | |
| 2005/0203729 A1 | 9/2005 | Roth et al. | |
| 2005/0203747 A1 | 9/2005 | Lecoeuche | |
| 2005/0261908 A1 | 11/2005 | Cross | |
| 2005/0265264 A1 * | 12/2005 | Hering et al. | 370/260 |
| 2005/0273769 A1 | 12/2005 | Eichenberger | |
| 2005/0283367 A1 | 12/2005 | Cross | |
| 2006/0047510 A1 | 3/2006 | Cross | |
| 2006/0064302 A1 | 3/2006 | Cross | |
| 2006/0069564 A1 | 3/2006 | Allison et al. | |
| 2006/0074680 A1 | 4/2006 | Cross | |
| 2006/0075120 A1 | 4/2006 | Smit | |
| 2006/0111906 A1 | 5/2006 | Cross | |
| 2006/0122836 A1 | 6/2006 | Cross | |
| 2006/0123358 A1 | 6/2006 | Lee et al. | |
| 2006/0136222 A1 | 6/2006 | Cross | |
| 2006/0146728 A1 | 7/2006 | Engelsma et al. | |
| 2006/0168095 A1 | 7/2006 | Sharma et al. | |
| 2006/0168595 A1 | 7/2006 | McArdle | |
| 2006/0184626 A1 | 8/2006 | Agapi | |
| 2006/0190264 A1 | 8/2006 | Jaramillo | |
| 2006/0218039 A1 | 9/2006 | Johnson | |
| 2006/0224430 A1 * | 10/2006 | Butt | 705/8 |
| 2006/0229880 A1 | 10/2006 | White | |
| 2006/0235694 A1 | 10/2006 | Cross | |
| 2006/0287845 A1 | 12/2006 | Cross et al. | |
| 2006/0287865 A1 | 12/2006 | Cross et al. | |
| 2006/0287866 A1 | 12/2006 | Cross et al. | |
| 2006/0288309 A1 | 12/2006 | Cross et al. | |
| 2007/0265851 A1 | 11/2007 | Cross et al. | |
| 2007/0274296 A1 | 11/2007 | Cross et al. | |
| 2007/0274297 A1 | 11/2007 | Cross et al. | |
| 2007/0288241 A1 | 12/2007 | Cross et al. | |
| 2007/0294084 A1 | 12/2007 | Cross | |
| 2008/0065386 A1 | 3/2008 | Cross et al. | |
| 2008/0065387 A1 | 3/2008 | Cross et al. | |
| 2008/0065388 A1 | 3/2008 | Cross et al. | |
| 2008/0065389 A1 | 3/2008 | Cross et al. | |
| 2008/0065390 A1 | 3/2008 | Ativanichayaphong et al. | |
| 2008/0086564 A1 | 4/2008 | Putman et al. | |
| 2008/0140410 A1 | 6/2008 | Cross et al. | |
| 2008/0162136 A1 | 7/2008 | Ativanichayaphong et al. | |
| 2008/0177530 A1 | 7/2008 | Cross et al. | |
| 2008/0177611 A1 * | 7/2008 | Sommers et al. | 705/8 |
| 2008/0195393 A1 | 8/2008 | Cross et al. | |
| 2008/0208584 A1 | 8/2008 | Cross et al. | |
| 2008/0208585 A1 | 8/2008 | Ativanichayaphong et al. | |
| 2008/0208586 A1 | 8/2008 | Ativanichayaphong et al. | |
| 2008/0208587 A1 | 8/2008 | Cross et al. | |
| 2008/0208588 A1 | 8/2008 | Cross et al. | |
| 2008/0208589 A1 | 8/2008 | Cross et al. | |
| 2008/0208590 A1 | 8/2008 | Cross et al. | |
| 2008/0208591 A1 | 8/2008 | Ativanichayaphong et al. | |
| 2008/0208592 A1 | 8/2008 | Cross et al. | |
| 2008/0208593 A1 | 8/2008 | Ativanichayaphong et al. | |
| 2008/0208594 A1 | 8/2008 | Cross et al. | |
| 2008/0228494 A1 | 9/2008 | Cross et al. | |
| 2008/0228495 A1 | 9/2008 | Cross et al. | |
| 2008/0235021 A1 | 9/2008 | Cross et al. | |
| 2008/0235022 A1 | 9/2008 | Cross et al. | |
| 2008/0235027 A1 | 9/2008 | Cross | |
| 2008/0235029 A1 | 9/2008 | Cross et al. | |
| 2008/0249782 A1 | 10/2008 | Ativanichayaphong et al. | |
| 2008/0255850 A1 | 10/2008 | Cross et al. | |
| 2008/0255851 A1 | 10/2008 | Cross et al. | |
| 2009/0094233 A1 * | 4/2009 | Marvit et al. | 707/5 |
| 2009/0204465 A1 * | 8/2009 | Pradhan | 705/9 |
| 2009/0234921 A1 * | 9/2009 | Dudley | 709/205 |
| 2009/0287685 A1 * | 11/2009 | Charnock et al. | 707/5 |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| EP | 0507148.5 | 4/2005 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

U.S. Appl. No. 12/109,151, filed Apr. 2008, Agapi, et al.
U.S. Appl. No. 12/109,167, filed Apr. 2008, Agapi, et al.
U.S. Appl. No. 12/109,204, filed Apr. 2008, Agapi, et al.
U.S. Appl. No. 12/109,227, filed Apr. 2008, Agapi, et al.
U.S. Appl. No. 12/109,214, filed Apr. 2008, Agapi, et al.
Office Action Dated Apr. 14, 2008 in U.S. Appl. No. 11/154,899.
Office Action Dated Dec. 30, 2008 in U.S. Appl. No. 11/154,899.
Office Action Dated Dec. 21, 2007 in U.S. Appl. No. 11/154,896.
Office Action Dated Apr. 17, 2008 in U.S. Appl. No. 11/154,900.
Office Action Dated Mar. 24, 2009 in U.S. Appl. No. 11/154,900.
Final Office Action Dated Aug. 14, 2008 in U.S. Appl. No. 11/154,899.
Final Office Action Dated Jun. 23, 2009 in U.S. Appl. No. 11/154,899.
Final Office Action Dated May 14, 2008 in U.S. Appl. No. 11/154,896.
Final Office Action Dated Oct. 27, 2008 in U.S. Appl. No. 11/154,900.
Axelsson, et al.; "XHTML+Voice Profile 1.2" INTERNET, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].
W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].
W3C: "Voice Extensible Markup Language (VoiceXML) 2.1, W3C Candidate Recommendation Jun. 13, 2005" INTERNET, [Online]

Jun. 13, 2005, pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. PCT/EP2008/051358.

PCT Search Report, Jun. 18, 2008; PCT Application No. PCT/EP2008/051363.

Didier Guillevic, et al.,Robust Semantic Confidence Scoring ICSLP 2002: 7$^{th}$ International Conference on Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

Final Office Action, U.S. Appl. No. 11/154,896, May 14, 2008.

Final Office Action, U.S. Appl. No. 11/154,899, Jun. 23, 2009.

Office Action, U.S. Appl. No. 12/109,227, Dec. 10, 2010.

* cited by examiner

SIGNALING CORRESPONDENCE BETWEEN A MEETING AGENDA AND A MEETING DISCUSSION

BACKGROUND OF THE INVENTION

1. Field of the Invention

The field of the invention is data processing, or, more specifically, methods, apparatus, and products for signaling correspondence between a meeting agenda and a meeting discussion.

2. Description of Related Art

A meeting is an event designed to facilitate the flow of information within a group of people. In a typical meeting, two or more people come together for the purpose of discussing one or more topics such as, for example, business or community event planning, financial forecasting, status reports, adhoc organization responses, and so on. Such a meeting may occur when participants gather together in the same physical locations such as a meeting room or while participants are scattered in disparate physical locations. Meetings of participants in disparate physical locations may be carried out using computers or other communications equipment to establish conference calls, video conference calls, chat rooms, virtual meeting rooms, and so on.

Unless meetings are properly planned and executed, meetings have the potential to waste an organization's resources. To enhance meeting efficiency, meetings often include a meeting agenda. A meeting agenda is typically created by the individual organizing the meeting and specifies the topics for discussion during the meeting. In such a manner, the meeting agenda may be used to guide the discussions of the participants during the meeting. In addition, the meeting agenda is often distributed to the meeting participates before the meeting begins to allow the participants time to prepare for the meeting.

Although a meeting agenda serves as a discussion guide during a meeting, human nature typically ensures that meetings go 'off-topic' or get 'off-schedule.' Going 'off-topic' refers to the tendency of participants to begin discussing topics not specified in the meeting agenda. Getting 'off-schedule' refers to the tendency of participants to discuss a particular meeting topic in the meeting agenda too long or not long enough based on the time frames that may be established in the meeting agenda. For example, meetings designated for brainstorming are often prone to going off-topic or getting off-schedule.

Going off-topic or getting off-schedule is not usually an intentional act by any of the participants of the meeting, such tendencies simply the result from the natural of flow conversations among humans. Unless someone facilitates the meeting who can firmly keep the meeting discussions about the topics specified in the meeting agenda, going off-topic or getting off-schedule are likely to occur. When the meeting facilitator is also a participant in the meeting that takes part in the meeting discussions, adhering the meeting discussion to the meeting agenda often becomes even more difficult.

SUMMARY OF THE INVENTION

Methods, apparatus, and products are disclosed for signaling correspondence between a meeting agenda and a meeting discussion that include: receiving a meeting agenda specifying one or more topics for a meeting; analyzing, for each topic, one or more documents to identify topic keywords for that topic; receiving meeting discussions among participants for the meeting; identifying a current topic for the meeting in dependence upon the meeting agenda; determining a correspondence indicator in dependence upon the meeting discussions and the topic keywords for the current topic, the correspondence indicator specifying the correspondence between the meeting agenda and the meeting discussion; and rendering the correspondence indicator to the participants of the meeting.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
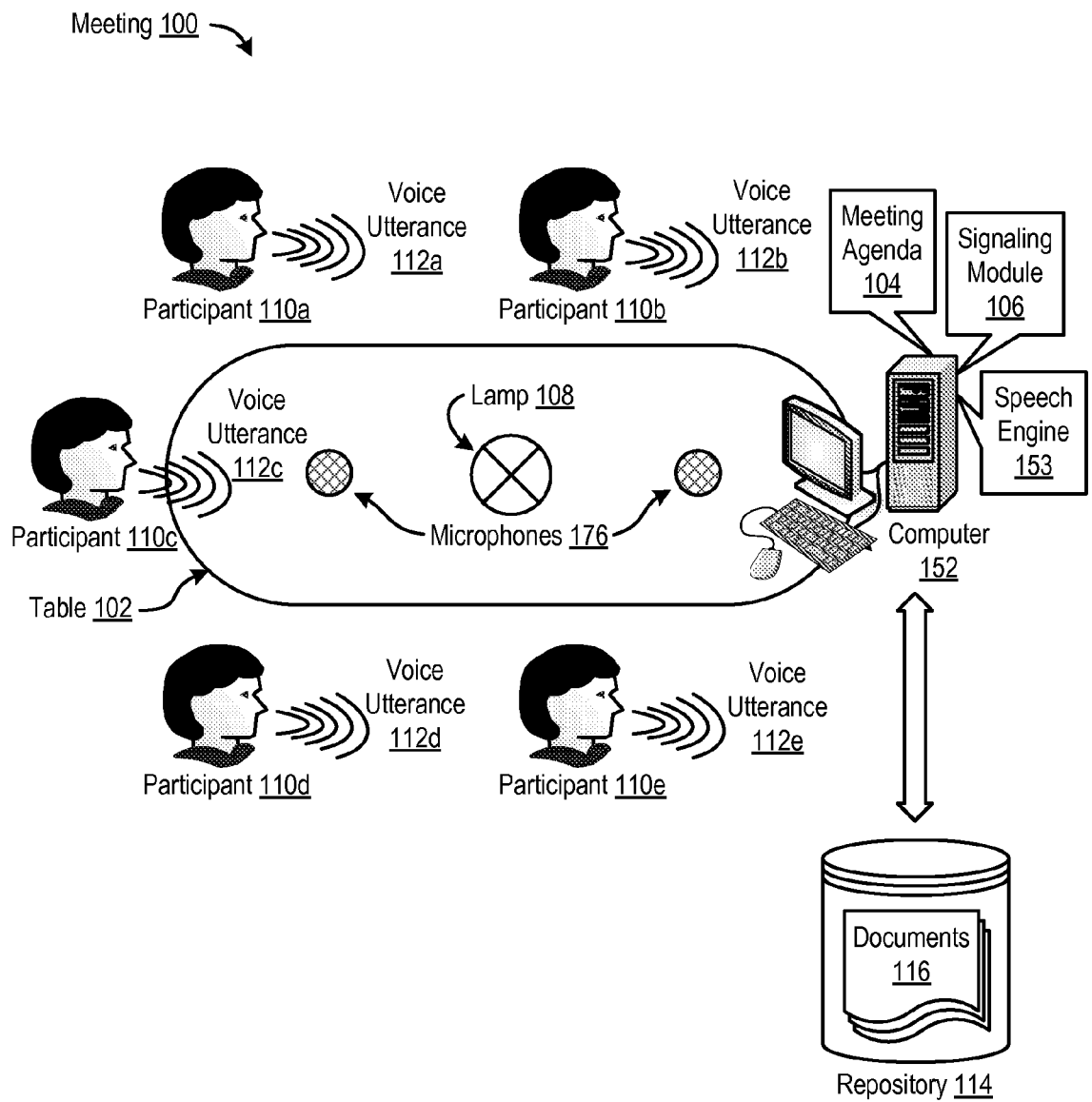
FIG. 1 sets forth a line drawing illustrating an exemplary system for signaling correspondence between a meeting agenda and a meeting discussion according to embodiments of the present invention.

Exemplary methods, apparatus, and products for signaling correspondence between a meeting agenda and a meeting discussion according to embodiments of the present invention are described with reference to the accompanying drawings, beginning with FIG. 1. FIG. 1 sets forth a line drawing illustrating an exemplary system for signaling correspondence between a meeting agenda (104) and a meeting discussion for a meeting (100) according to embodiments of the present invention. The meeting (100) of FIG. 1 includes several participants (110) around a table (102) discussing various topics. Readers will note that conducting the meeting (100) with the participants (110) around the table (102) however is for explanation only and not for limitation. In fact, in some other embodiments, the exemplary meeting (100) may be conducted while the participants (110) are in disparate locations using a conference call, video conferencing, virtual conference rooms with avatars of the participants, and so on.

The meeting (100) in the exemplary system of FIG. 1 is guided by a meeting agenda (104). The meeting agenda (104) of FIG. 1 is a document that specifies the topics for discussion during the meeting (100). Each topic of the meeting agenda (104) represents a theme of conversation among the participants (110). The meeting agenda (104) of FIG. 1 is often generated by the organizer of the meeting (100), and electronic or paper copies of the meeting agenda (104) may be provided to the participants before or during the meeting (100).

The exemplary system of FIG. 1 also includes a computer (152) adjacent to the participants (110) in the meeting (100). The computer (152) has installed upon it a signaling module (106) that includes a set of computer program instructions for signaling correspondence between a meeting agenda (104) and a meeting discussion according to embodiments of the present invention. The signaling module (106) operates generally for signaling correspondence between a meeting agenda and a meeting discussion according to embodiments of the present invention by: receiving a meeting agenda (104) specifying one or more topics for the meeting (100); analyzing, for each topic, one or more documents (116) to identify topic keywords for that topic; receiving meeting discussions among meeting participants (110) for the meeting (100); identifying a current topic for the meeting (100) in dependence upon the meeting agenda (104); determining a correspondence indicator in dependence upon the meeting discussions and the topic keywords for the current topic, the correspondence indicator specifying the correspondence between the meeting agenda (104) and the meeting discussion; and rendering the correspondence indicator to participants (110) of the meeting (100).

In many embodiments, the level of correspondence between the meeting agenda (104) and the discussions during the meeting (100) may be useful beyond merely keeping the meeting discussions on the topics and schedule specified by the meeting agenda (104). For example, an organization may desire to monitor the performance of individuals facilitating meetings for members of the organization. The signaling module (106) may therefore also operate generally for signaling correspondence between a meeting agenda and a meeting discussion according to embodiments of the present invention by: repeatedly recording the correspondence indictor throughout the meeting (100) in a historical repository for further evaluation.

Often participants (110) may not always discuss all of the topics specified in the meeting agenda (104) during the meeting (100). At the end of the meeting (100) therefore, a report listing discussed and undiscussed topics may be useful. Accordingly, the signaling module (106) may also operate generally for signaling correspondence between a meeting agenda and a meeting discussion according to embodiments of the present invention by: identifying the topics of the meeting agenda (104) that were discussed during the meeting (100); identifying the topics of the meeting agenda (104) that were not discussed during the meeting (100); and generating a report that specifies the topics of the meeting agenda (104) that were discussed during the meeting and the topics of the meeting agenda (104) that were not discussed during the meeting.

As mentioned above, the signaling module (106) uses keywords for the topics in the meeting agenda (104) to determine the level of correspondence between the meeting agenda (104) and the current meeting discussion. The signaling module (106) analyzes one or more documents (116) for each topic to identify the topic keywords for each topic. In the example of FIG. 1, the documents (116) are stored in a repository (114). The repository (114) may be implemented as database on the computer (152) or remotely accessible to the computer (152) through a network. The documents (116) of FIG. 1 are documents that include content related to any of the topics in the meeting agenda (104). For example, the documents (116) may be implemented as reports or papers concerning a particular topic, transcripts from previous meetings in which a particular topic was discussed, presentations regarding a topic, and so on.

In the exemplary meeting (100) of FIG. 1, the meeting discussions are implemented as voice utterances (112) exchanged among participants (110). The signaling module (106) of FIG. 1 therefore receives meeting discussions among meeting participants (110) for the meeting (100) by receiving voice utterances (112) of meeting participants (110) through microphones (176). The microphones (176) of FIG. 1 are operatively coupled to the computer (152) through wired or wireless data communications connections. The voice utterances (112) of FIG. 1 may be captured and digitized according to industry standard codecs, including but not limited to those used for speech recognition as such. Methods for 'COding/DECoding' speech are referred to as 'codecs.' The European Telecommunications Standards Institute ('ETSI') provides several codecs for encoding speech for use in speech recognition, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled RTP Payload Format for European Telecommunications Standards Institute (ETSI) European Standard ES 201 108 Distributed Speech Recognition Encoding and the Internet Draft entitled RTP Payload Formats for European Telecommunications Standards Institute (ETSI) European Standard ES 202 050, ES 202 211, and ES 202 212 Distributed Speech Recognition Encoding, the IETF provides standard RTP payload formats for various codecs. It is useful to note, therefore, that there is no limitation in the present invention regarding codecs, payload formats, or packet structures. Voice utterances for signaling correspondence between a meeting agenda and a meeting discussion according to embodiments of the present invention may be encoded using any codec, including, for example:

AMR (Adaptive Multi-Rate Speech coder)
    ARDOR (Adaptive Rate-Distortion Optimized sound codeR),
    Dolby Digital (A/52, AC3),
    DTS (DTS Coherent Acoustics),
    MP1 (MPEG audio layer-1),
    MP2 (MPEG audio layer-2) Layer 2 audio codec (MPEG-1, MPEG-2 and non-ISO MPEG-2.5),
    MP3 (MPEG audio layer-3) Layer 3 audio codec (MPEG-1, MPEG-2 and non-ISO MPEG-2.5),
    Perceptual Audio Coding,
    FS-1015 (LPC-10),
    FS-1016 (CELP),
    G.726 (ADPCM),
    G.728 (LD-CELP),
    G.729 (CS-ACELP),
    GSM,
    HILN (MPEG-4 Parametric audio coding), and
    others as may occur to those of skill in the art.

Using the voice utterances (112) of the participants (110), the signaling module (106) of FIG. 1 may determine a correspondence indicator in dependence upon the meeting discussion and the topic keywords for the current topic of the meeting (100) by: transcribing the voice utterances for the meeting into a current meeting transcription; tracking a frequency at which the topic keywords for the current topic appear in the current meeting transcription; and determining the correspondence indicator in dependence upon the tracked frequency.

The signaling module (106) of FIG. 1 has installed upon it a speech engine (153) useful for transcribing the voice utterances (112) for the meeting into a current meeting transcription. The speech engine (153) of FIG. 1 is a functional module, typically a software module, although it may include specialized hardware also, that does the work of recognizing and generating human speech. The speech engine (153) of FIG. 1 implements speech recognition by use of a further module referred to in this specification as an automated speech recognition ('ASR') engine, and the speech engine carries out speech synthesis by use of a further module referred to in this specification as a text-to-speech ('TTS') engine. As shown in FIG. 1, a speech engine (153) may be installed locally with the signaling module (106) in the computer (152), but in some other embodiments, the speech engine (153) may be installed remotely with respect to the signaling module (106) and accessed across a data communications network by the computer (152).

In the example of FIG. 1, the signaling module (106) renders the correspondence indicator to participants of the meeting through a lamp (108) positioned in the center of the table (102) and connected to the computer (152) through a wired or wireless communication connection. That is, in FIG. 1, the correspondence indicator is implemented as the color of the light emitted from the lamp (108). For example, when there is a strong correspondence between the meeting agenda (104) and the current meeting discussion, the lamp (108) may emit a green light to signal to the participants (110) that the meeting (100) is on-topic and on-schedule. When there is a weak correspondence between the meeting agenda (104) and the current meeting discussion, the lamp (108) may emit a red light to signal to the participants (110) that the meeting (100) is off-topic and off-schedule. Between the strong correspondence and the weak correspondence, the lamp (108) may emit a yellow light to signal to the participants (110) that the meeting discussion may be drifting off-topic or off-schedule relative to the meeting agenda (104). Readers will note that the exemplary correspondence indicator and the exemplary manner of rendering the correspondence indicator to participants of the meeting through a lamp (108) is for explanation only and not for limitation. The correspondence indicator may be implemented as text, graphics, colors, sounds, tactile indicators, or any other indicators using any modes as will occur to those of skill in the art. The signaling module (106) may render the correspondence indicator to participants using any number of peripherals or devices operatively coupled to the computer (152) including for example, speakers, displays, lamps, and so on. One line of peripherals and devices that may be improved for signaling correspondence between a meeting agenda and a meeting discussion according to embodiments of the present invention may include the product line provided by Ambient Devices, Inc.

The arrangement of hardware and software components making up the exemplary system illustrated in FIG. 1 is for explanation, not for limitation. Data processing systems useful for signaling correspondence between a meeting agenda and a meeting discussion according to various embodiments of the present invention may include other components not shown and be configured in other ways as will occur to those of skill in the art. In addition, various embodiments of the present invention may be implemented on a variety of hardware platforms in addition to those illustrated in FIG. 1.

Signaling correspondence between a meeting agenda and a meeting discussion according to embodiments of the present invention may be implemented with one or more computers, that is, automated computing machinery. For further explanation, therefore, FIG. 2 sets forth a block diagram of automated computing machinery comprising an example of a computer useful in signaling correspondence between a meeting agenda and a meeting discussion according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer.

Figure 2:
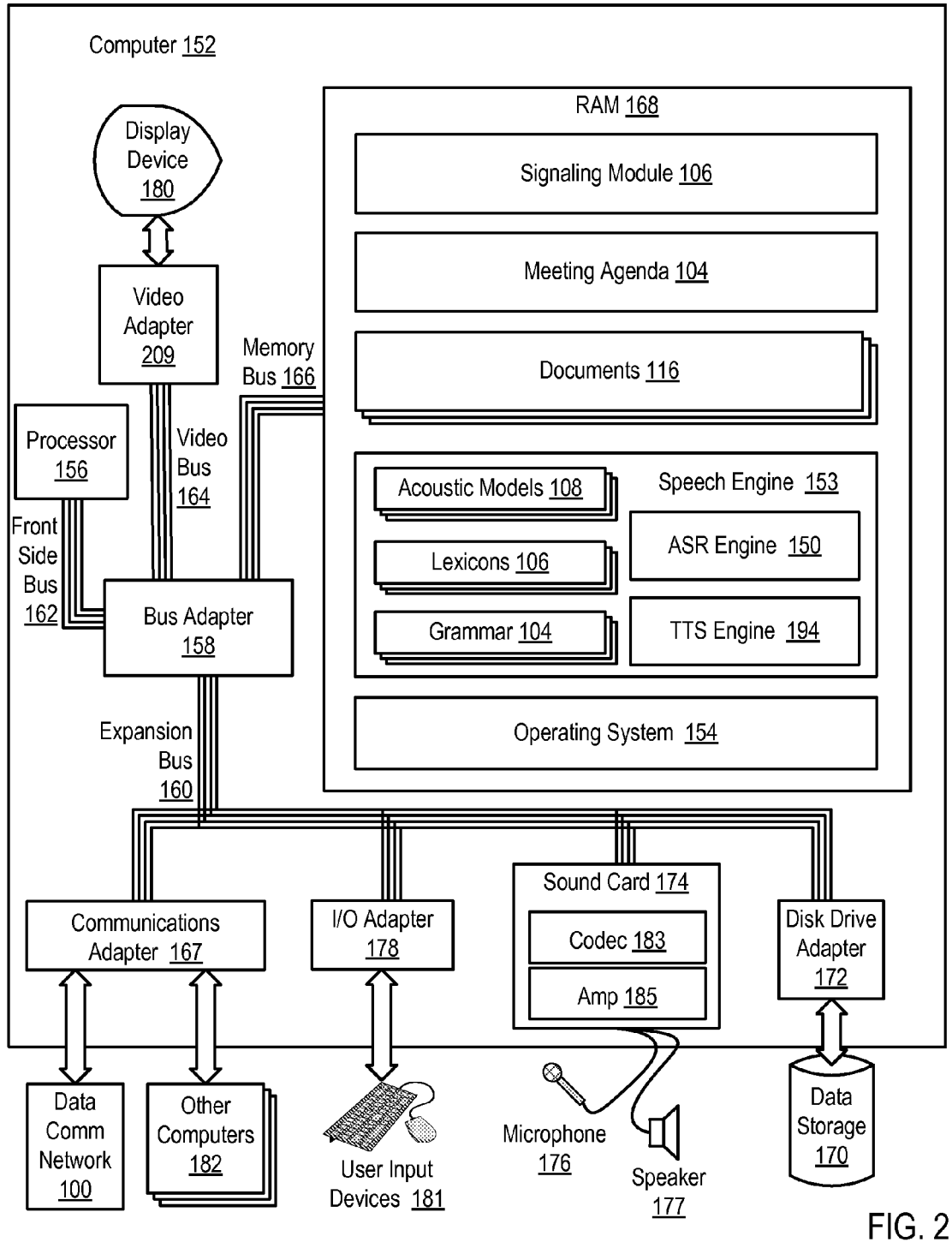
FIG. 2 sets forth a block diagram of automated computing machinery comprising an example of a computer useful in signaling correspondence between a meeting agenda and a meeting discussion according to embodiments of the present invention.

Stored in RAM (168) of FIG. 2 is a signaling module (106), a set of computer program instructions capable of signaling correspondence between a meeting agenda (104) and a meeting discussion according to embodiments of the present invention. The signaling module (106) operates generally for signaling correspondence between a meeting agenda and a meeting discussion according to embodiments of the present invention by: receiving a meeting agenda (104) specifying one or more topics for the meeting; analyzing, for each topic, one or more documents (116) to identify topic keywords for that topic; receiving meeting discussions among meeting participants (110) for the meeting; identifying a current topic for the meeting in dependence upon the meeting agenda (104); determining a correspondence indicator in dependence upon the meeting discussions and the topic keywords for the current topic, the correspondence indicator specifying the correspondence between the meeting agenda (104) and the meeting discussion; and rendering the correspondence indicator to participants (110) of the meeting. When the meeting discussions are implemented as voice utterances (112) exchanged among participants (110), the signaling module (106) may transcribe the voice utterances (112) for the meeting into a current meeting transcription used to determine the correspondence indictor for the meeting. The signaling module (104) of FIG. 2 utilizes a speech engine to transcribe the voice utterances (112).

Also stored in RAM (168) is a speech engine (153). The speech engine (153) of FIG. 2 is a functional module, typically a software module, although it may include specialized hardware also, that does the work of recognizing and generating human speech. The speech engine (153) includes an ASR engine (150) for speech recognition and a text-to-speech ('TTS') engine (194) for generating speech. The speech engine also includes grammars (104), lexicons (106), and language-specific acoustic models (108).

The acoustic models (108) associate speech waveform data representing recorded pronunciations of speech with textual representations of those pronunciations, which are referred to as 'phonemes.' The speech waveform data may be implemented as a Speech Feature Vector ('SFV') that may be represented, for example, by the first twelve or thirteen Fourier or frequency domain components of a sample of digitized speech waveform. Accordingly, the acoustic models (108) may be implemented as data structures or tables in a database, for example, that associates these SFVs with phonemes representing, to the extent that it is practically feasible to do so, all pronunciations of all the words in various human languages, each language having a separate acoustic model (108). The lexicons (106) are associations of words in text form with phonemes representing pronunciations of each word; the lexicon effectively identifies words that are capable of recognition by an ASR engine. Each language has a separate lexicon (106).

The grammars (104) of FIG. 2 communicate to the ASR engine (150) the words and sequences of words that currently may be recognized. For precise understanding, readers will distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Also stored in RAM (168) is an operating system (154). Operating systems useful in voice servers according to embodiments of the present invention include UNIX™, Linux™, Microsoft Vista™, IBM's AIX™, IBM's i5/OS™, and others as will occur to those of skill in the art. Operating system (154), speech engine (153), grammar analysis module (132), grammar reliability table (134), and background noises (142) in the example of FIG. 2 are shown in RAM (168), but many components of such software typically are stored in non-volatile memory also, for example, on a disk drive (170).

Computer (152) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in computers according to embodiments of the present invention include the Intel Northbridge, the Intel Memory Controller Hub, the Intel Southbridge, and the Intel I/O Controller Hub. Examples of expansion buses useful in computers according to embodiments of the present invention include Peripheral Component Interconnect ('PCI') and PCI-Extended ('PCI-X') bus, as well as PCI Express ('PCIe') point to point expansion architectures and others.

Computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The example computer of FIG. 2 includes one or more input/output ('I/O') adapters (178). I/O adapters in computers implement user-oriented input/output through, for example, software drivers and computer hardware for controlling output to display devices such as computer display screens, as well as user input from user input devices (181) such as keyboards and mice. The example computer of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for testing a grammar used in speech recognition for reliability in a plurality of operating environments having different background noise according to embodiments of the present invention include modems for wired dial-up communications, Ethernet (IEEE 802.3) adapters for wired data communications network communications, and 802.11 adapters for wireless data communications network communications.

Figure 3:
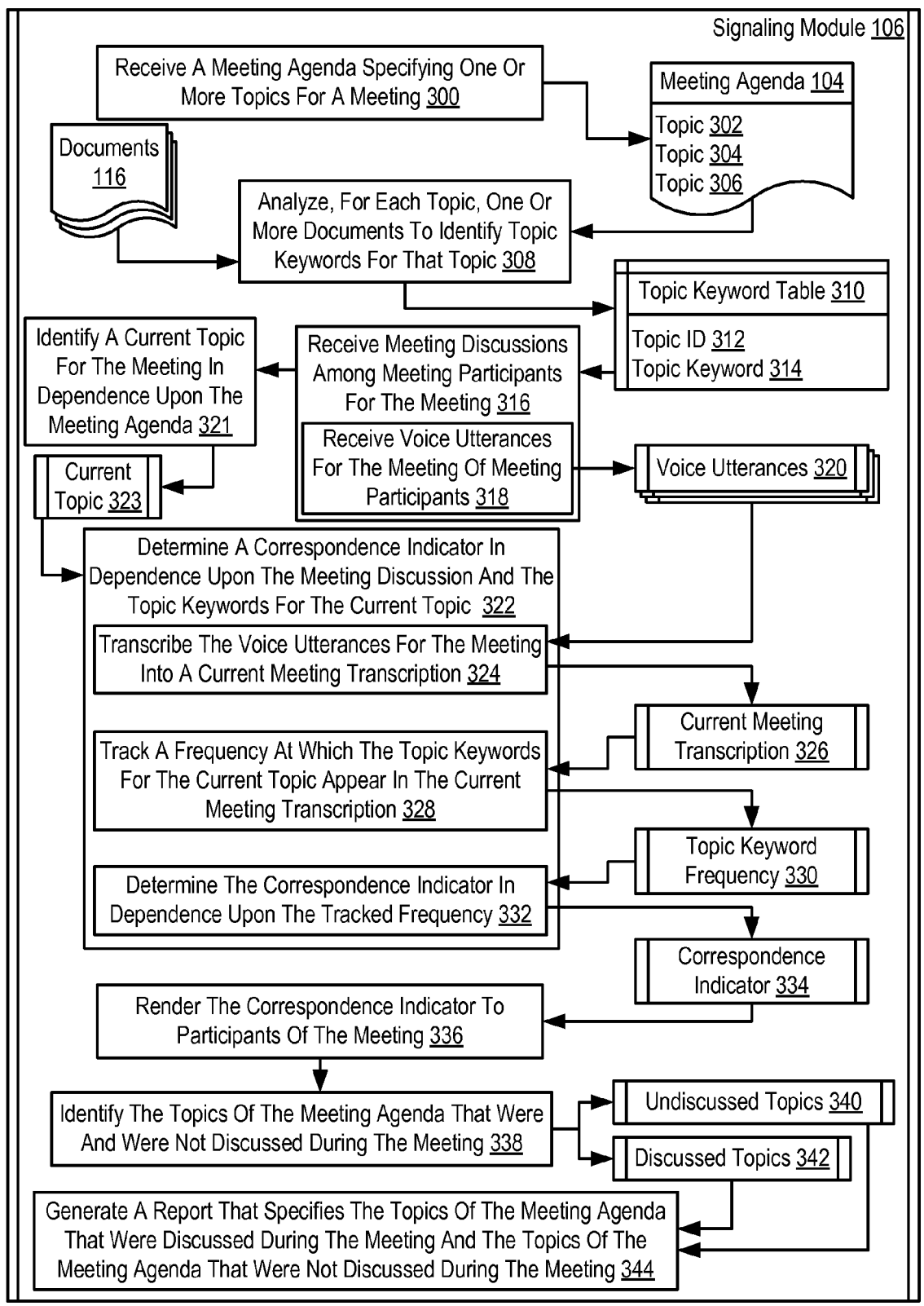
FIG. 3 sets forth a flow chart illustrating an exemplary method of signaling correspondence between a meeting agenda and a meeting discussion according to embodiments of the present invention.

For further explanation, FIG. 3 sets forth a flow chart illustrating an exemplary method of signaling correspondence between a meeting agenda and a meeting discussion according to embodiments of the present invention. Signaling correspondence between a meeting agenda and a meeting discussion according to embodiments of the present invention may be carried out by a signaling module (106) installed on a computer.

The method of FIG. 3 includes receiving (300) a meeting agenda (104) specifying one or more topics (302, 304, 306) for a meeting. The signaling module (106) of FIG. 3 may receive (300) the meeting agenda (104) by receiving the meeting agenda (104) or an identifier for the meeting agenda (104) from the meeting organizer. When an identifier is received, the signaling module (106) of FIG. 3 may then in turn retrieve the meeting agenda (104) specified by the identifier from the local or remote storage area. The meeting organizer may specify or provide the meeting agenda (104) to the signaling module (106) through a user interface provided by the signaling module (106). In some other embodiments, the meeting organizer may provide the meeting agenda (104) or its identifier to the signaling module (106) by sending an email that includes the meeting agenda (104) or its identifier to an email address monitored by the signaling module (106).

The method of FIG. 3 includes analyzing (308), for each topic (302, 304, 306), one or more documents (116) to identify topic keywords for that topic. The documents (116) of FIG. 3 are documents that include content related to any of the topics in the meeting agenda (104). For example, the documents (116) may be implemented as reports or papers concerning a particular topic, transcripts from previous meetings in which a particular topic was discussed, and so on. Analyzing (308) one or more documents (116) to identify topic keywords for a topic allows the signaling module (106) to identify topic keywords for the topic as the words in the documents (116) that appear more frequently in the documents that relate to the topic relative to all of the documents (116) that relate to all of the topics.

For each topic (302, 304, 306), the signaling module (106) may analyze (308) one or more documents (116) to identify topic keywords for that topic by identifying a first set of documents related to that topic and identifying a second set of documents related to the other topics. The first set of documents includes the documents (116) related to the topic for which keywords are being identified and may be specified by the meeting organizer when the meeting agenda (104) is specified. Similarly, the second set of documents includes the documents (116) related to the other topics and may also be specified by the meeting organizer when the meeting agenda (104) is specified. The signaling module (106) may then calculate a first frequency at which a particular word appears in the first set of documents and calculate a second frequency at which the particular word appears in both the first set of documents and the second set of document. In such a manner, the first frequency represents the number of times a particular word is found in a subset of the documents (116), and the second frequency represents the number of times a particular word is found in all of the documents (116). The signaling module (106) may then designate the particular word as one of the topic keywords in dependence upon the first frequency and the second frequency. The signaling module (106) may designate the particular word as one of the topic keywords by determining whether the difference between the first frequency and the second frequency exceeds a predetermined threshold and designating the particular word as one of the topic keywords if the difference between the first frequency and the second frequency exceeds the predetermined threshold. In some other embodiments, the signaling module (106) may designate the particular word as one of the topic keywords by determining whether the ratio of the first frequency to the second frequency exceeds a predetermined threshold and designating the particular word as one of the topic keywords if the ratio of the first frequency to the second frequency exceeds the predetermined threshold.

For further explanation, consider an example in which a meeting agenda includes two topics—'Company Picnic Planning' and 'Sales Presentation'—and in which a LastYearMeetingTranscript document relates to the Company Picnic Planning topic and three Customer reports relate to the Sales Presentation topic. In determining the topic keywords for the Company Picnic Planning topic, the signaling module may select any words from any of the documents as the particular words that are candidates for topic keywords. Assume for example that the signaling module selects the words 'the' and 'drinks.' The word 'the' appears in the LastYearMeetingTranscript document at an average rate of fifteen times per page and appears in all four documents at an average rate of sixteen times per page. The word 'drinks' appears in the LastYearMeetingTranscript document at an average rate of twelve times per page and appears in all four documents at an average rate of two times per page. Because the difference or ratio between frequency of 'the' in the LastYearMeetingTranscript document and of 'the' in all of the documents represents that the word 'the' is not utilized more or less in documents related to the Company Picnic Planning topic, then the word 'the' is not designated as a topic keyword. In contrast, however, because the difference or ratio between frequency of 'drinks' in the LastYearMeetingTranscript document and of 'drinks' in all of the documents represents that the word 'drinks' is utilized much more in documents related to the Company Picnic Planning topic than the other documents, then the word 'drinks' is designated as a topic keyword for the Company Picnic Planning topic.

As part of analyzing (308) one or more documents (116) to identify topic keywords, the signaling module (106) of FIG. 3 may store a particular word in a topic keyword field (314) of a topic keyword table (310) after designating the particular word as a topic keyword. The topic keyword table (310) associates topics with one or more topic keywords. Each record of the topic keyword table (310) includes a topic identifier field (312) and a topic keyword field (314). The topic identifier field (312) specifies a particular topic in the meeting agenda (104), and the topic keyword field (314) stores a topic keyword in associated with its corresponding topic.

The method of FIG. 3 includes receiving (316) meeting discussions among participants for the meeting. In the method of FIG. 3, receiving (316) meeting discussions among participants for the meeting includes receiving (318) voice utterances (320) for the meeting of participants. In meetings that occur at a single physical location, the signaling module (106) may receive (318) voice utterances (320) for the meeting of participants according to the method of FIG. 3 through a microphone positioned at the physical location and may then digitize and encode the voice utterances (320) using any codec as will occur to those of skill in the art. When meetings occur using a conference call, video conferencing, or the like, the signaling module (106) may receive (318) voice utterances (320) for the meeting of participants according to the method of FIG. 3 through a direct connection with the conferencing hardware and may then digitize and encode the voice utterances (320) using a codec. In some embodiments in which the conference occurs through a packet switched network as opposed to the circuit switched network, the voice utterance (320) may already be digitized, encoded, and packetized for distribution to the various participants in the meeting. In such an embodiment, the signaling module (106) may receive (318) voice utterances (320) for the meeting of participants according to the method of FIG. 3 by retrieving copies of the packets and unencapsulating the digitized and encoded voice utterances (320) from the packets.

The method of FIG. 3 includes identifying (321) a current topic (323) for the meeting in dependence upon the meeting agenda (104). The current topic (323) of FIG. 3 represents the topic specified by the meeting agenda (104) as the topic currently schedule for discussion. The meeting agenda (104) may associate times with each topic (302, 304, 306) or a particular order in which the topics (302, 304, 306) are to be discussed during the meeting. In such a manner, the signaling module (106) may identify (321) the current topic (323) for the meeting according to the method of FIG. 3 by comparing the current time with the times associated with each topic (302, 304, 306) in the meeting agenda (104) and selecting the topic associated with the current time. For example, consider that an exemplary meeting agenda specifies that a meeting starts at two o'clock in the afternoon, the first topic is open for discussion for five minutes, and the second topic is open for discussion for ten minutes. At 2:10 p.m., the signaling module may identify the current topic as the second topic specified the meeting agenda. Readers will note however that other ways of identifying (321) a current topic (323) for the meeting in dependence upon the meeting agenda (104) may also be useful.

The method of FIG. 3 also includes determining (322) a correspondence indicator (334) in dependence upon the meeting discussions and the topic keywords for the current topic (323). The correspondence indicator (334) of FIG. 3 specifies the correspondence between the meeting agenda (104) and the meeting discussion. In the method of FIG. 3, determining (322) a correspondence indicator (334) includes: transcribing (324) the voice utterances (320) for the meeting into a current meeting transcription (326); tracking (328) a frequency (330) at which the topic keywords for the current topic (323) appear in the current meeting transcription (326); and determining (332) the correspondence indicator (334) in dependence upon the tracked frequency (330). The current meeting transcription (326) of FIG. 3 is a textual representation of the meeting discussions among the various participants in the meeting.

The signaling module (106) may transcribe (324) the voice utterances (320) for the meeting into the current meeting transcription (326) according to the method of FIG. 3 by providing the voice utterances (320) to a speech engine for speech recognition. The speech engine may use a Statistical Language Model ('SLM') grammar to convert the speech to text. An SLM grammar provides to speech engine the words that currently may be recognized and maintains a set of training data used to assign a probability to a sequence of recognized words. A speech engine uses the SLM grammar to recognize the result of an utterance provided by a user. Consider, for example, an utterance consisting of the word sequence: "I am here." Using an SLM grammar, a speech engine may recognize the utterance as any one of the following word combinations and may assign probabilities to each combination indicated in the table below:

| WORD COMBINATION | | | PROBABILITY |
|---|---|---|---|
| Eye | am | hear | 0.12% |
| I | am | hear | 0.54% |
| Eye | am | here | 0.21% |
| I | am | here | 15.12% |

The speech engine may estimate the probability of each word sequence by measuring the occurrence of the word order in a set of training data. Using the combination 'I am here,' for example, the speech engine may compute both the number of times 'am' is preceded by 'I' and the number of times 'here' is preceded by 'I am.' Based on the probabilities assigned to each sequence of words, the speech engine may return the recognition result as 'I am here' because this combination of words has the highest probability based on the set of training data specified by the SLM grammar. Because estimating the probability for every possible word sequence is not practically feasible, a SLM grammar may assign each word to a part of speech, such as, for example noun, verb, adjective, adverb, preposition, and so on. A speech engine may then estimate the probability of each possible result by measuring the occurrence of the order in which the parts of speech appear in a set of test data. In the example of FIG. 3, the signaling module (106) may use the documents (116) along with other documents such as, for example, transcripts from previous meetings as training data for the SLM grammar.

SLM grammars for use in signaling correspondence between a meeting agenda and a meeting discussion according to embodiments of the present invention may be expressed in any format supported by a speech engine. An exemplary format may include the Stochastic Language Models (N-Gram) Specification promulgated by the W3C. Using the SLM grammar for speech recognition advantageously allows the speech engine to recognize an unlimited number of word combinations, thus allowing more robust signaling correspondence between a meeting agenda and a meeting discussion according to embodiments of the present invention.

The signaling module (106) may track (328) a frequency (330) at which the topic keywords for the current topic (323) appear in the current meeting transcription (326) according to the method of FIG. 3 by determining the number of times that one of the topic keywords appears in the portion of the current meeting transcription (326) representing the most recent meeting discussions in the meeting. The current meeting transcriptions (326) may include timestamps that the signaling module (106) uses to correlate meeting times with various portion of the transcript (326). For example, consider that the keywords associated with the current topic (323) include 'drinks' and 'food.' The signaling module (106) may determine the number of times that the words 'drinks' and 'food' appear in the portion of the current meeting transcription (326) that represents the most recent sixty seconds of the meeting discussions among participants.

The signaling module (106) may determine (332) the correspondence indicator (334) in dependence upon the tracked frequency (330) according to the method of FIG. 3 by comparing the topic keyword frequency (330) to a set of predetermined thresholds that relate to various correspondence indicators and selecting a correspondence indicator (334) based on the comparison. For example, consider that two thresholds for topic keyword frequency exist at values of ten and thirty and that three correspondence indicators are implemented using the colors red, yellow, and green. In such an example, a topic keyword frequency at or below the threshold of ten may be associated with a correspondence indicator of 'red' to signal that not many keywords for the current topic (323) are being detected in the current meeting discussions, thereby indicating that the correspondence between the meeting agenda (104) and meeting discussions is weak. As such the signaling module (106) may render the red color using a lamp or some other device as to alert the meeting participants that the discussion is off-topic or off-schedule.

Continuing with the example, a topic keyword frequency between the threshold of ten and thirty may be associated with a correspondence indicator of 'yellow' to signal that a fair number of keywords for the current topic (323) are being detected in the current meeting discussions, thereby indicating that the correspondence between the meeting agenda (104) and meeting discussions is neither weak nor strong. As such the signaling module (106) may render the yellow color using a lamp or some other device to signal the meeting participants that the discussion may be drifting towards becoming off-topic or off-schedule. Continuing with the example, a topic keyword frequency at or above the threshold of thirty may be associated with a correspondence indicator of 'green' to signal that many keywords for the current topic (323) are being detected in the current meeting discussions, thereby indicating that the correspondence between the meeting agenda (104) and meeting discussions is strong. As such the signaling module (106) may render the green color using a lamp or some other device to inform the meeting participants that the discussion is on-topic and on-schedule. Readers will note that the exemplary correspondence indicators above are for explanation only and not for limitation. In fact, the correspondence indicators may be implemented in many other ways as will occur to those of skill in the art, including for example text, numbers, graphics, sounds, colors, tactile indicators, and so on.

The method of FIG. 3 includes rendering (336) the correspondence indicator (334) to the participants of the meeting. The manner in which the signaling module (106) renders (336) the correspondence indicator (334) may often depend on the type of device used to communicate the correspondence indicator (334) to the participants and how the device is connected to the signaling module (106). In some embodiments, the device used to communicate the correspondence indicator (334) to the participants may include a device such as those provided by Ambient Device, Inc. In some other embodiments, the device used to communicate the correspondence indicator (334) to the participants may include a display used to render a graphical user interface ('GUI') provided by the signaling module (106) or some other software component. In addition to the manner described above, readers will note that other ways of rendering (336) the correspondence indicator (334) to the participants of the meeting may also be useful.

The method of FIG. 3 also includes identifying (338) the topics (340, 342) of the meeting agenda that were and were not discussed during the meeting. The signaling module (106) may identify (338) the topics (340, 342) of the meeting agenda that were and were not discussed during the meeting according to the method of FIG. 3 by determining the number of times the topic keywords for each topic appears in the portion of the current meeting transcription (326) corresponding to the portion of the meeting devoted to that topic in the meeting agenda (104). When the number of times that the topic keywords for a particular topic appearing in that topic's portion of the current meeting transcription (326) is below a predefined threshold, then the signaling module (109) may designate that topic as one of the topics (340) not discussed in the meeting. When the number of times that the topic keywords for a particular topic appearing in that topic's portion of the current meeting transcription (326) is at or above a predefined threshold, then the signaling module (109) may designate that topic as one of the topics (342) that was discussed in the meeting.

The method of FIG. 3 includes generating (344) a report that specifies the topics (342) of the meeting agenda (104) that were discussed during the meeting and the topics (340) of the meeting agenda (104) that were not discussed during the meeting. The report may be implemented as two lists, one list specifying the topics (342) of the meeting agenda (104) that were discussed during the meeting and the other list specifying the topics (340) of the meeting agenda (104) that were not discussed during the meeting. The signaling module (106) may generate (344) the report according to the method of FIG. 3 electronically for display to the participants on a user interface provided by the signaling module (106) or for electronic transmittal to the participants. In other embodiments, the signaling module (106) may generate (344) the report according to the method of FIG. 3 by printing the report on paper or some other medium as will occur to those of skill in the art for distribution to the participants.

Figure 4:
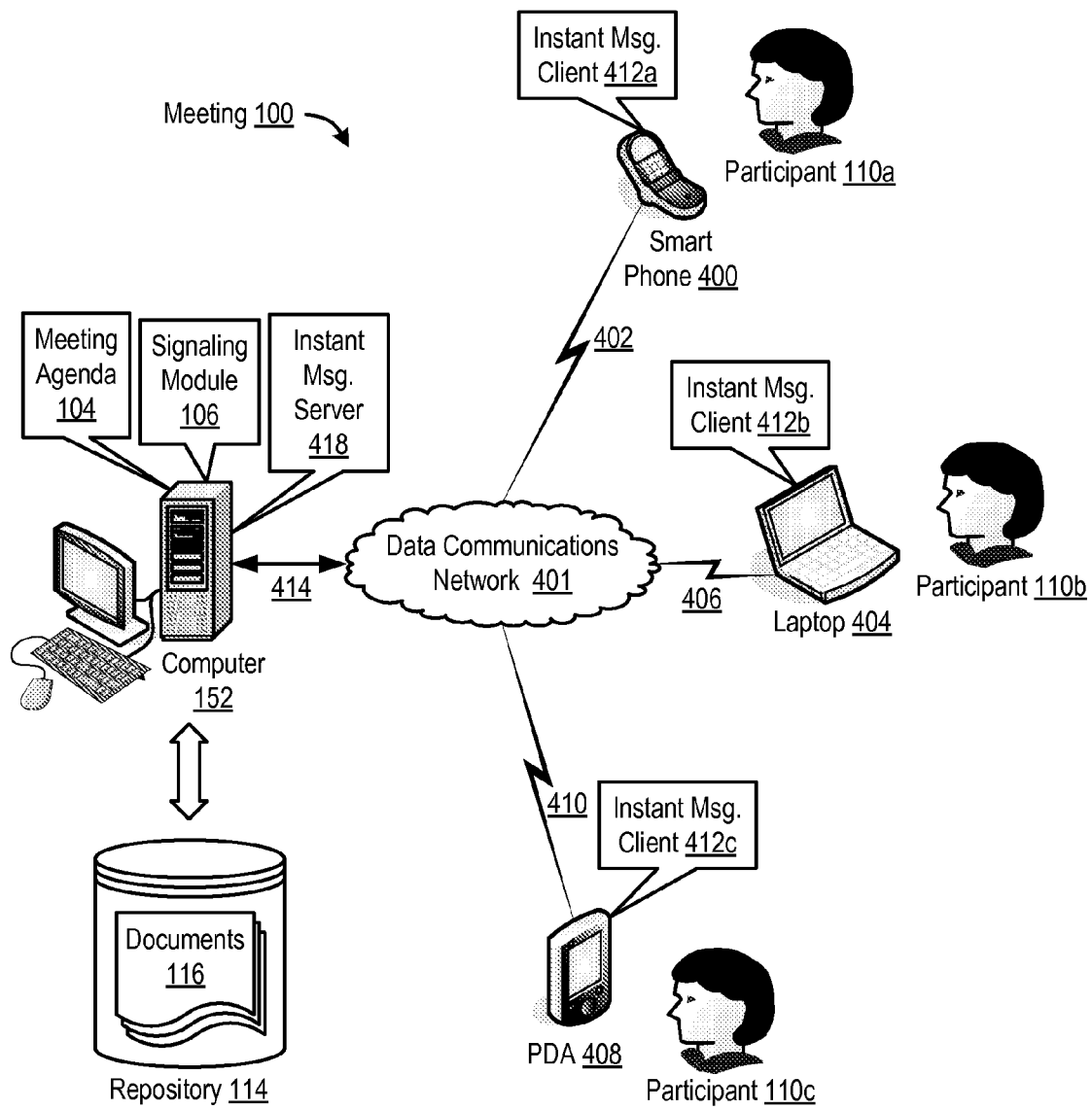
FIG. 4 sets forth a network diagram illustrating a further exemplary system for signaling correspondence between a meeting agenda and a meeting discussion according to embodiments of the present invention.

The explanations above with reference to FIGS. 1-3 describe meetings in which the participants communicate via voice utterances. In some other embodiments, the meeting participants may communicate during the meeting using other non-voice modes such as, for example, text or instant messaging. For further explanation, FIG. 4 sets forth a network diagram illustrating a further exemplary system for signaling correspondence between a meeting agenda and a meeting discussion for a meeting (100) according to embodiments of the present invention. The meeting (100) of FIG. 4 is implemented using instant messaging. Instant messaging is a technology that facilitates near real-time text-based communication between two or more participants over a network.

In the example of FIG. 4, the participants (110) exchange instant messages through instant messaging clients (412) installed on the devices utilized by the participants (110). In the example of FIG. 4, participant (10a) utilizes a smart phone (400) having instant message client (412a) installed upon it. Participant (110b) utilizes a laptop (404) having instant message client (412b) installed upon it. Participant (110c) utilizes a personal digital assistance ('PDA') (408) having instant message client (412c) installed upon it. Each instant messaging client (412) provides a GUI through which a participant (110) may create a message for delivery to the instant messaging clients (412) of other participants (110) and through which a participant (110) may view messages received from the instant messaging clients (412) of other participants (110). Examples of instant messaging clients that may be improved for use according to embodiments of the present invention may include AOL Instant Messenger (AIM®), Google™ Talk, iChat, IBM™ Lotus Sametime, ICQ®, and so on.

The instant message clients (412) of FIG. 4 distribute the instant messages to each other through an instant messaging server (418) installed on the computer (152). The instant messaging server (418) of FIG. 4 may receive a message from one of the instant messaging clients (412) and transmit the message to the other instant messaging clients (412), stores instant messages exchanged between instant message clients (412), manage participants' instant message accounts, control various aspects of the instant message clients (412), and so on. Examples of instant messaging protocols useful in passing messages between the instant messaging clients (412) and the instant message server (418) may include Internet Relay Chat ('RC') protocol, the Microsoft Notification Protocol ('MSNP'), the Open System for CommunicAtion in Realtime ('OSCAR') protocol, and others as will occur to those of skill in the art.

In the exemplary system of FIG. 4, the computer (152) also has installed upon it a signaling module (106), which is a set of computer program instructions for signaling correspondence between a meeting agenda (104) and the meeting discussion according to embodiments of the present invention. The signaling module (106) operates generally for signaling correspondence between a meeting agenda and a meeting discussion according to embodiments of the present invention by: receiving a meeting agenda (104) specifying one or more topics for the meeting (100); analyzing, for each topic, one or more documents (116) in repository (114) to identify topic keywords for that topic; receiving meeting discussions among meeting participants (110) for the meeting (100); identifying a current topic for the meeting (100) in dependence upon the meeting agenda (104); determining a correspondence indicator in dependence upon the meeting discussions and the topic keywords for the current topic, the correspondence indicator specifying the correspondence between the meeting agenda (104) and the meeting discussion; and rendering the correspondence indicator to participants (110) of the meeting (100).

As mentioned above, the meeting discussions in the meeting (100) of FIG. 4 are implemented as instant messages exchanged among the participants (110). Accordingly, the signaling module (106) of FIG. 4 receives meeting discussions among participants for the meeting (100) by receiving instant messages of participants (110) for the meeting (100). The signaling module (106) may receive the instant messages by registering with the instant messaging server (418) through an application programming interface ('API') exposed by the server (418). The signaling module (106) of FIG. 4 may then utilize the instant messages among the participants (110) to determine a correspondence indicator by tracking a frequency at which the topic keywords for the current topic appear in the instant messages and determining the correspondence indicator in dependence upon the tracked frequency.

In the example of FIG. 4, the computer (152) having the instant messaging server (418) installed upon it and the devices (400, 404, 408) having the instant messaging clients (412) installed upon them are connected together for data communications through the network (401). Specifically, the computer (152) is connected to the data communications network (401) through wireline connection (414). The smart phone (400) is connected to the data communications network (401) through wireless connection (402). The laptop (406) is connected to the data communications network (401) through wireless connection (406). The PDA (408) is connected to the data communications network (401) through wireless connection (410).

The data communications network (401) of FIG. 4 is composed of a plurality of computers that function as data communications routers, switches, or gateways connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

- a link layer with the Ethernet™ Protocol or the Wireless Ethernet™ Protocol,
- a data communications network layer with the Internet Protocol ('IP'),
- a transport layer with the Transmission Control Protocol ('TCP') or the User Datagram Protocol ('UDP'),
- an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
- other protocols as will occur to those of skill in the art.

The arrangement of the devices (152, 400, 404, 408) and the data communications network (401) making up the exemplary system illustrated in FIG. 4 are for explanation, not for limitation. Data processing systems useful for signaling correspondence between a meeting agenda and a meeting discussion according to various embodiments of the present invention may include additional servers, routers, switches, gateways, other devices, and peer-to-peer architectures, not shown in FIG. 4, as will occur to those of skill in the art. Data communications networks in such data processing systems may support many data communications protocols in addition to those noted above. Various embodiments of the present invention may be implemented on a variety of hardware platforms in addition to those illustrated in FIG. 4.

Figure 5:
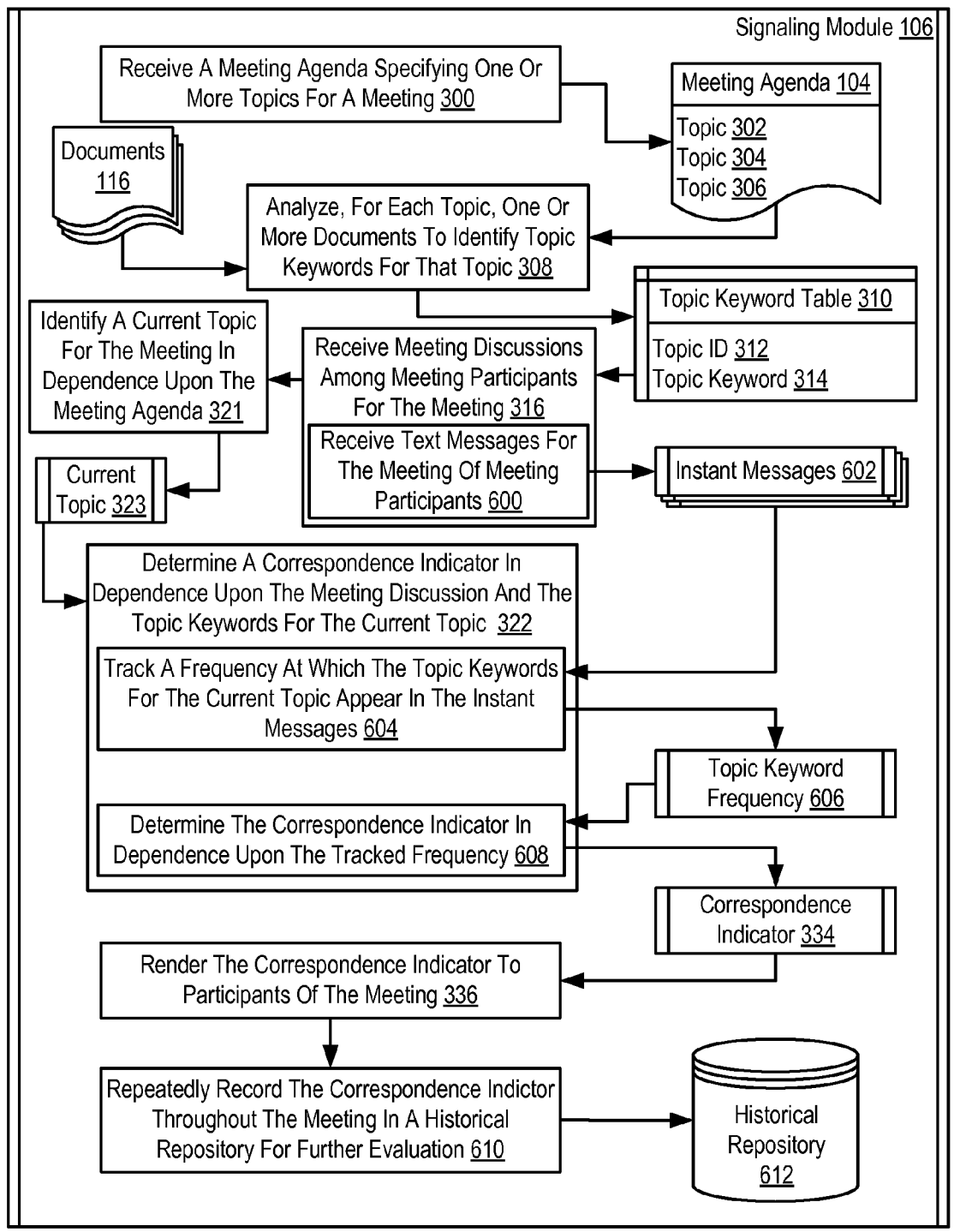
FIG. 5 sets forth a flow chart illustrating a further exemplary method of signaling correspondence between a meeting agenda and a meeting discussion according to embodiments of the present invention.

For further explanation, FIG. 5 sets forth a flow chart illustrating a further exemplary method of signaling correspondence between a meeting agenda and a meeting discussion according to embodiments of the present invention. As mentioned above, signaling correspondence between a meeting agenda and a meeting discussion according to embodiments of the present invention may be carried out by a signaling module (106) installed on a computer.

The method of FIG. 5 is similar to the method of FIG. 3. That is, the method of FIG. 5 includes: receiving (300) a meeting agenda (104) specifying one or more topics (302, 304, 306) for a meeting; analyzing (308), for each topic (302, 304, 306), one or more documents (116) to identify topic keywords for that topic; receiving (316) meeting discussions among participants for the meeting; identifying (321) a current topic (323) for the meeting in dependence upon the meeting agenda (104); determining (322) a correspondence indicator (334) in dependence upon the meeting discussions and the topic keywords for the current topic (323), the correspondence indicator (334) specifying the correspondence between the meeting agenda (104) and the meeting discussion; and rendering (336) the correspondence indicator (334) to the participants of the meeting. The example of FIG. 5 is also similar to the example of FIG. 3 in that the example of FIG. 5 includes a topic keyword table (310) that associates keywords with particular topics using a topic identifier field (312) and a topic keyword field (314).

In the method of FIG. 5, receiving (316) meeting discussions among participants for the meeting includes receiving (600) instant messages (602) for the meeting of participants. The signaling module (106) may receive (600) instant messages (602) for the meeting of participants according to the method of FIG. 5 by registering with an instant messaging server to receive the instant messages for the meeting. The signaling module may repeatedly poll the instant messaging server for new instant messages or wait for the instant messaging server to push the instant messages to the signaling module (106).

In the method of FIG. 5, determining (322) a correspondence indicator (334) specifying the correspondence between the meeting agenda (104) and the meeting discussion includes: tracking (604) a frequency at which the topic keywords for the current topic appear in the instant messages (602); and determining (608) the correspondence indicator (334) in dependence upon the tracked frequency (606). The signaling module (106) may track (604) a frequency at which the topic keywords for the current topic appear in the instant messages (602) by determining the number of times that one of the topic keywords appears in the instant messages (602) representing the most recent meeting discussions among participant in the meeting.

For example, consider that the keywords associated with the current topic (323) include 'drinks' and 'food.' The signaling module (106) may determine the number of times that the words 'drinks' and 'food' appear in the instant messages (602) that represents the most recent sixty seconds of the meeting discussions among participants. The explanation above describes tracking a frequency at which the topic keywords for the current topic appear in the instant messages using topic keywords that consist of only one word each. Readers will note however that topic keywords may consist of multiple words or phrases. In such embodiments, readers will note that tracking (604) a frequency at which the topic keywords for the current topic appear in the instant messages (602) may utilize a statistical language model to determine whether a phrase in the instant messages (602) matches the topic keywords. The advantage of using a statistical language model is that the phrase need not be a precise match-rather, the phrase in the instant messages (602) need merely by statistically similar to the topic keywords phrase.

The signaling module (106) may determine (608) the correspondence indicator (334) in dependence upon the tracked frequency (606) according to the method of FIG. 5 by comparing the tracked frequency (606) to a set of predetermined thresholds that relate to various correspondence indicators and selecting a correspondence indicator (334) based on the comparison. For example, consider that two thresholds for topic keyword frequency exist at values of twenty and fifty and that three correspondence indicators are implemented using the colors red, purple, and blue that are displayed on a portion of the instant messaging GUI rendered to each participant. In such an example, a topic keyword frequency at or below the threshold of twenty may be associated with a correspondence indicator of 'red' to signal that not many keywords for the current topic (323) are being detected in the current meeting discussions, thereby indicating that the correspondence between the meeting agenda (104) and meeting discussions is weak. As such the signaling module (106) may render the red color on the instant messaging client GUI's to alert the meeting participants that the discussion is off-topic or off-schedule.

Continuing with the example, a topic keyword frequency between the threshold of twenty and fifty may be associated with a correspondence indicator of 'purple' to signal that a fair number of keywords for the current topic (323) are being detected in the current meeting discussions, thereby indicating that the correspondence between the meeting agenda (104) and meeting discussions is neither weak nor strong. As such the signaling module (106) may render the purple color on the instant messaging client GUI's to signal the meeting participants that the discussion may be drifting towards becoming off-topic or off-schedule. Continuing with the example, a topic keyword frequency at or above the threshold of fifty may be associated with a correspondence indicator of 'blue' to signal that many keywords for the current topic (323) are being detected in the current meeting discussions, thereby indicating that the correspondence between the meeting agenda (104) and meeting discussions is strong. As such the signaling module (106) may render the blue color on the instant messaging client GUI's to inform the meeting participants that the discussion is on-topic and on-schedule. Readers will note that the exemplary correspondence indicators above are for explanation only and not for limitation. In fact, the correspondence indicators may be implemented in many other ways as will occur to those of skill in the art, including for example text, numbers, graphics, sounds, colors, tactile indicators, and so on.

The method of FIG. 5 also includes repeatedly recording (610) the correspondence indictor (334) throughout the meeting in a historical repository (612) for further evaluation because the level of correspondence between the meeting agenda (104) and the discussions during the meeting may be useful beyond merely keeping the meeting discussions on the topics (302, 304, 306) and schedule specified by the meeting agenda (104). For example, an organization may desire to monitor the performance of individuals facilitating meetings for members of the organization. The historical repository (612) may be implemented as tables in a database, a structured document, or some other data structure useful for archiving the correspondence indicators. The signaling module (106) may repeatedly record (610) the correspondence indictor (334) throughout the meeting according to the method of FIG. 5 by sampling the values representing the correspondence indicator (334) a predetermined sampling rate and storing the sampled correspondence indicators in the historical repository (612) with a timestamp. In such a manner, other members of an organization or an organization's analysis software may determine how the meeting discussion throughout a meeting corresponded with the meeting's meeting agenda.

Exemplary embodiments of the present invention are described largely in the context of a fully functional computer system for signaling correspondence between a meeting agenda and a meeting discussion. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of signaling correspondence between a meeting agenda and a meeting discussion, by a signaling module executing on a device, the method comprising:
receiving a meeting agenda specifying one or more topics for a meeting;
analyzing, for each topic, one or more documents to identify topic keywords for that topic;
receiving, by an automated speech recognition engine, meeting discussions among participants for the meeting, wherein said receiving the meeting discussions among participants for the meeting comprises receiving voice utterances for the meeting of participants;
generating, by the automated speech recognition engine, a textual representation of the meeting discussions in a current meeting transcription;
identifying a current topic for the meeting in dependence upon the meeting agenda;
tracking a frequency at which the topic keywords for the current topic appear in the current meeting transcription;
determining a correspondence indicator in dependence upon the tracked frequency at which the topic keywords for the current topic appear in the current meeting transcription, the correspondence indicator specifying the correspondence between the meeting agenda and the meeting discussion; and
rendering the correspondence indicator to the participants of the meeting.

2. The method of claim 1 further comprising repeatedly recording the correspondence indictor throughout the meeting in a historical repository for further evaluation.

3. The method of claim 1 further comprising:
identifying the topics of the meeting agenda that were discussed during the meeting;
identifying the topics of the meeting agenda that were not discussed during the meeting; and
generating a report that specifies the topics of the meeting agenda that were discussed during the meeting and the topics of the meeting agenda that were not discussed during the meeting.

4. The method of claim 1 further comprising:
tracking a second frequency at which the topic keywords for the current topic appear in instant messages of the meeting participants; and
determining the correspondence indicator in dependence upon the second tracked frequency at which the topic keywords for the current topic appear in instant messages as well as the frequency at which the topic keywords for the current topic appear in the current meeting transcription;
wherein said receiving meeting discussions among participants for the meeting further comprises receiving the instant messages for the meeting of participants.

5. The method of claim 1 wherein analyzing, for each topic, one or more documents to identify topic keywords for that topic further comprises:
identifying a first set of documents related to that topic;
identifying a second set of documents related to the other topics;
calculating a first frequency at which a particular word appears in the first set of documents;

calculating a second frequency at which the particular word appears in both the first set of documents and the second set of document; and designating the particular word as one of the topic keywords in dependence upon the first frequency and the second frequency.

6. An apparatus for signaling correspondence between a meeting agenda and a meeting discussion, the apparatus comprising a computer processor and a computer memory operatively coupled to the computer processor, the computer memory having disposed within it computer program instructions capable of:

receiving a meeting agenda specifying one or more topics for a meeting;

analyzing, for each topic, one or more documents to identify topic keywords for that topic;

receiving meeting discussions among participants for the meeting, wherein said receiving the meeting discussions among participants for the meeting comprises receiving voice utterances for the meeting of participants;

generating a textual representation of the meeting discussions in a current meeting transcription;

identifying a current topic for the meeting in dependence upon the meeting agenda;

tracking a frequency at which the topic keywords for the current topic appear in the current meeting transcription;

determining a correspondence indicator in dependence upon the tracked frequency at which the topic keywords for the current topic appear in the current meeting transcription, the correspondence indicator specifying the correspondence between the meeting agenda and the meeting discussion; and rendering the correspondence indicator to the participants of the meeting.

7. The apparatus of claim 6 wherein the computer memory has disposed within it computer program instructions capable of repeatedly recording the correspondence indictor throughout the meeting in a historical repository for further evaluation.

8. The apparatus of claim 6 wherein the computer memory has disposed within it computer program instructions capable of:

identifying the topics of the meeting agenda that were discussed during the meeting;

identifying the topics of the meeting agenda that were not discussed during the meeting; and generating a report that specifies the topics of the meeting agenda that were discussed during the meeting and the topics of the meeting agenda that were not discussed during the meeting.

9. The apparatus of claim 6 wherein the computer program instructions are further capable of:

tracking a second frequency at which the topic keywords for the current topic appear in instant messages of the meeting participants; and determining the correspondence indicator in dependence upon the second tracked frequency at which the topic keywords for the current topic appear in instant messages as well as the frequency at which the topic keywords for the current topic appear in the current meeting transcription;

wherein the computer program instructions capable of receiving meeting discussions among participants for the meeting further comprises the computer program instructions being capable of receiving instant messages for the meeting of participants.

10. The apparatus of claim 6 wherein analyzing, for each topic, one or more documents to identify topic keywords for that topic further comprises:

identifying a first set of documents related to that topic;

identifying a second set of documents related to the other topics;

calculating a first frequency at which a particular word appears in the first set of documents;

calculating a second frequency at which the particular word appears in both the first set of documents and the second set of document; and designating the particular word as one of the topic keywords in dependence upon the first frequency and the second frequency.

11. A computer program product for signaling correspondence between a meeting agenda and a meeting discussion, the computer program product disposed upon a computer readable medium that comprises a recordable medium, the computer program product comprising computer program instructions capable of:

receiving a meeting agenda specifying one or more topics for a meeting;

analyzing, for each topic, one or more documents to identify topic keywords for that topic;

receiving meeting discussions among participants for the meeting, wherein said receiving the meeting discussions among participants for the meeting comprises receiving voice utterances for the meeting of participants;

generating a textual representation of the meeting discussions in a current meeting transcription;

identifying a current topic for the meeting in dependence upon the meeting agenda;

tracking a frequency at which the topic keywords for the current topic appear in the current meeting transcription;

determining a correspondence indicator in dependence upon the tracked frequency at which the topic keywords for the current topic appear in the current meeting transcription, the correspondence indicator specifying the correspondence between the meeting agenda and the meeting discussion; and rendering the correspondence indicator to the participants of the meeting.

12. The computer program product of claim 11 further comprising computer program instructions capable of repeatedly recording the correspondence indictor throughout the meeting in a historical repository for further evaluation.

13. The computer program product of claim 11 further comprising computer program instructions capable of:

identifying the topics of the meeting agenda that were discussed during the meeting;

identifying the topics of the meeting agenda that were not discussed during the meeting; and generating a report that specifies the topics of the meeting agenda that were discussed during the meeting and the topics of the meeting agenda that were not discussed during the meeting.

14. The computer program product of claim 11 wherein the computer program instructions are further capable of:

tracking a second frequency at which the topic keywords for the current topic appear in instant messages of the meeting participants; and determining the correspondence indicator in dependence upon the second tracked frequency at which the topic keywords for the current topic appear in instant messages as well as the frequency at which the topic keywords for the current topic appear in the current meeting transcription;

wherein the computer program instructions capable of receiving meeting discussions among participants for the meeting further comprises the computer program instructions being capable of receiving instant messages for the meeting of participants.

15. The computer program product of claim 11 wherein analyzing, for each topic, one or more documents to identify topic keywords for that topic further comprises:

identifying a first set of documents related to that topic;

identifying a second set of documents related to the other topics;

calculating a first frequency at which a particular word appears in the first set of documents;

calculating a second frequency at which the particular word appears in both the first set of documents and the second set of document; and designating the particular word as one of the topic keywords in dependence upon the first frequency and the second frequency.

* * * * *